Jan. 28, 1969   A. A. AYKANIAN ET AL   3,424,826
METHOD FOR SELECTIVE ABSORPTION OF FOAMING
AGENT IN FOAMING PLASTIC ARTICLES
Filed July 8, 1964
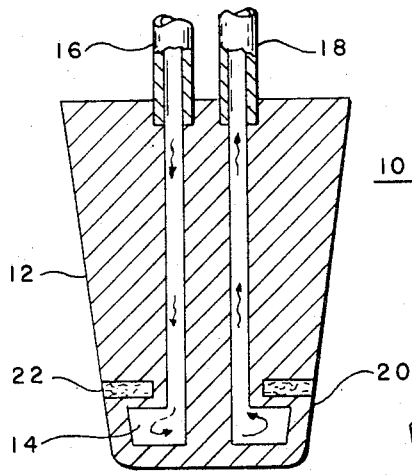
Fig. I
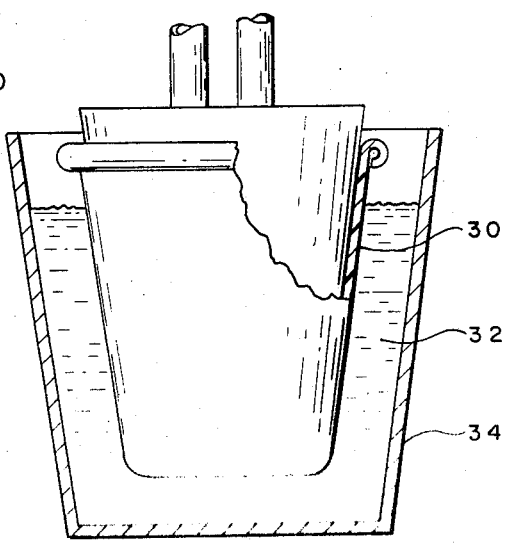
Fig. II
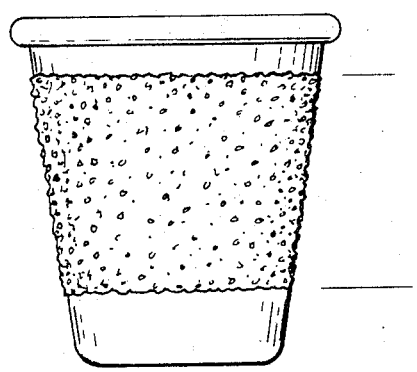
Fig. III
RICHARD K. SHELBY.
ARDASHUS A. AYKANIAN. *INVENTORS.*
BY James C. Logomasini
ATTORNEY.

_United States Patent Office_

3,424,826
Patented Jan. 28, 1969

3,424,826
METHOD FOR SELECTIVE ABSORPTION OF FOAMING AGENT IN FOAMING PLASTIC ARTICLES
Ardashus A. Aykanian, Wilbraham, Mass., and Richard K. Shelby, Downers Grove, Ill., assignors to Monsanto Company, St. Louis, Mo., a corporation of Delaware
Filed July 8, 1964, Ser. No. 381,144
U.S. Cl. 264—48          11 Claims
Int. Cl. B29d 27/00

ABSTRACT OF THE DISCLOSURE

This invention relates to a process for selectively foaming portions of a plastic articles by controlling the surface temperature of the article during the steeping step of a partial foaming process.

---

The present invention relates to plastic articles of manufacture and more particularly articles of manufacture having insulating surfaces.

It is well known in the art that plastic foams can be made by incorporating a blowing agent or liberating gas material into a thermoplastic resin and subsequently raising the temperature of the resin. This causes the blowing agent to convert from a solid or liquid state to a gaseous state thereby expanding the resin to produce cellular structures. The resulting foamed resin is of a much lighter density than the original resin and generally possesses greatly increased sound dampening and heat insulating properties.

In spite of the advantages gained by foaming plastic resins, the use of these foamed materials has been limited for many purposes because of the comparatively poor structural strengths of the final fabricated articles. To minimize this problem, various methods for supporting the foamed resin have been devised, most of which involved adhering or bonding solid or rigid members to the foam. However, these structures are generally difficult and expensive to construct and are sometimes limited in their application depending on the effectiveness of the bonding operation and the difficulty of preserving the foam intact.

In a copending application Ser. No. 272,540, filed Apr. 12, 1963, now U.S. Patent No. 3,262,625, patented July 26, 1966, and assigned to the same assignee of the present application, there is described the formation of plastic articles which combine the insulating characteristics of foamed resin and the structural stability and strength of nonfoamed plastic. In brief, these plastic articles are produced by steeping a plastic article in a medium which is absorbable by the plastic for a predetermined interval of time, removing the plastic article from the medium and finally heating the plastic article to produce a foamed cover. In this manner, plastic articles such as containers, conduits, etc., are obtained which have good insulating and structural characteristics. Unfortunately, serious problems have been encountered when attempting to control the extent of the area or surface on the plastic article to be foamed. This is primarily due to the difficulty of controlling the area extent of medium contact with the plastic article particularly at high speed production operations. This situation is particularly serious in the case of nestable containers where an over extension of the foam surface area can result in the containers jamming together making the entire stack useless for dispensing and canteen applications.

Accordingly, it is a principal object of the present invention to foam predetermined surface areas on plastic articles.

Another object of the present invention is to foam predetermined surface areas on plastic articles at high speed production rates.

A further object of the present invention is to control the extent of the foamed surface area on plastic articles which are produced by exposing the surface to a medium which is absorbable by the plastic and subsequently heating the surface.

A further object of this invention is to provide method and means to attain the preceding objects.

Other objects of this invention will in part be obvious and will in part appear hereinafter.

These and other objects are attainable by causing a surface portion of a plastic article to assume a predetermined temperature, exposing at least part of said surface portion to a medium which is absorbable by the plastic and applying heat to the plastic article to produce a foam covering having a boundary along at least part of the edge of said surface portion. The medium which is absorbable by the plastic is considered to be any material which is (1) absorbable by the plastic being processed, and (2) convertible to gaseous state at a temperature below the melting point temperature of the plastic.

The following drawings are provided for the purpose of illustrating various embodiments of the present invention.

FIGURE I is a side view, partly in section and with parts broken, illustrating the use of a mandrel to control the surface temperature of a plastic article of manufacture.

FIGURE II is a side view, partly in section and with parts broken, illustrating how the mandrel in FIGURE I is inserted into a container to control the outer surface temperature of the container during immersion in a medium which is absorbable by the plastic.

FIGURE III illustrates a container produced from the partial foaming process utilizing the mandrel shown in FIGURES I and II.

Referring in detail to the figures of the drawings and more specifically FIGURE I, there is shown a mandrel 10 having an external surface 12 used to control the surface temperature of a plastic article of manufacture, in this case a container. For this purpose, the mandrel has a temperature control zone 14 at the lowermost portion of the mandrel which is provided with an inlet 16 and an outlet 18 for the circulation of a cooling medium. The circulation of a cooling medium through the temperature control zone 14 serves to cool the portion 20 of the external surface 12 of the mandrel 10. In the embodiment shown in FIGURE I, a heat insulator 22 is used to prevent the remainder of the surface area 12 of the mandrel from being cooled.

FIGURE II illustrates the manner in which the present invention may be carried out. More specifically, the mandrel 10 is inserted into a container 30 thereby cooling the lower portion of the plastic container which is in contact with the cooled surface portion 20 of the mandrel. The mandrel with the attached container is then partially submerged in a medium 32 which is absorbable by the plastic. The medium 32 is confined in a tank 34. As a result of this cooling step, the amount of medium which is absorbed at the lower portion of the container is greatly reduced in relation to the remaining immersed portion. Consequently, when the plastic container is heated, only the uncooled surface area of the container which was in contact with the medium will foam. In other words, cooling the plastic at specific areas was sufficient to inhibit any foaming tendency at those areas during the subsequent heating operation. FIGURE III illustrates a cup partially foamed using the steps described and detailed in FIGURES I and II.

The above description and particularly the drawings are set forth for the purpose of illustration and not for the purpose of limitation. In the practice of the present invention, designated surface portions of a plastic article of manufacture are regulated temperature-wise to control the amount of absorption taking place when the plastic article of manufacture is steeped or exposed to a medium which is absorbable by the plastic. In this manner, it is possible to accurately control the extent of the area foamed on plastic articles of manufacture by temperature control means. If the proper control is not exercised, plastic articles such as containers may be produced which are deficient in structural and/or insulating properties and unsuitable for certain applications, for example, cups which must be readily dispensable from stacked arrangements, i.e., canteen machines, etc. In other words, contact between an overly extended foam surface of one cup with the side of an adjacent nesting cup would tend to inhibit the cup from falling freely from the bottom of the stack. Even if stack release is assured, the extent of the foam covering must be such to ensure relatively friction-free passage through the drop chute normally used in most canteen machines.

There are numerous ways in which temperature control of a plastic article of manufacture may be effected to carry out the present invention. For example, a mandrel such as illustrated in FIGURE I may be employed which utilizes one or more temperature control zones. If desired, the control zone may even be heated to accelerate rather than inhibit absorption. In the latter case, the medium is one that is not readily absorbable by the plastic at lower temperatures.

It is not intended to limit the means for controlling the temperature of the plastic to a mandrel which fits inside the plastic article. Any means which are capable of controlling the temperature of designated portions of the plastic article to either inhibit or accelerate the absorption of a medium is within the scope of this invention. It is possible in most instances to heat or chill the plastic article by heating or cooling means which are removed just prior to exposure to the medium. In brief, any plastic article of manufacture which is foamable by the process described in copending application Ser. No. 272,540, filed Apr. 12, 1963, now U.S. Patent No. 3,262,625, patented July 26, 1966, and assigned to the same assignee of the present application, may be treated in accordance with the practice of this invention to selectively foam portions of the plastic article.

The use of a mandrel as described and shown in the drawings provides a suitable method for controlling the foam surface area on containers. Contact between the mandrel external surface and the inner surface of a container will result in a rather rapid heat exchange across the body of the plastic conforming fairly close to the external surface temperature design of the mandrel. Consequently, designated areas of the outer surface of containers can be foamed with extremely good precision and at high production rates. Furthermore, it is possible to vary the number and arrangement of the temperature zones within the mandrel to provide for almost any foamed surface design desired. In general, the optimum temperatures utilized will depend on the type of plastic being foamed, the particular medium used in the process and the time length of exposure to the medium.

The effect of some of these variables may be illustrated by the following example which is given to illustrate the invention and is not intended as a limitation thereof. Unless otherwise specified, quantities are mentioned on a weight basis.

EXAMPLE I

Styrene homopolymer having a Staudinger molecular weight of approximately 55,000 is molded from a sheet in the form of a smooth, tapered cup which is approximately four inches in height with an average inside cup diameter of 2¼". The average thickness of the cup is about 10 mils.

The cup formed by the above operation is transported to and superimposed onto a temperature controlled mandrel such as illustrated in FIGURE I. A water:glycol heat transfer mixture is circulated through the mandrel to provide a surface temperature at the lowermost portion of the mandrel of 30° F. The remainder of the cup is at approximately room temperature or 70° F. The lower or bottom portion of the cup is then immersed in a medium composed of Freon (trichlorofluoromethane) up to within one-half inch of its top peripheral edge. The cup is maintained in this immersed condition for a period of 5 seconds after which the cup is withdrawn from the medium and the mandrel is removed. After the cup is withdrawn from the medium, it is exposed to a 70° temperature atmosphere for 15 seconds and then heated by 250° F. air for a period of 6 seconds.

The resulting cup, which is illustrated in FIGURE III, has a foamed outer surface extending over the area exposed to the medium except at the areas cooled by the mandrel.

If a mandrel is employed, the outer configuration of the mandrel will, of course, depend on (1) the shape of the plastic container which is to be partially foamed, (2) the extent of the surface area on the outside of the plastic container which is to be foamed, and (3) the extent of the surface area which is to be inhibited from foaming. In brief, the shape of the mandrel will vary in accordance with the plastic product being produced in order to provide fairly intimate contact between the mandrel and the plastic. The construction of the mandrel may be of any rigid or semirigid material which has the capacity for conducting heat, relative uniformity and as adiabatic as possible. Suitable materials would include steel, aluminum, copper and various alloys. The exterior may also be polished to further reduce the frictional forces between the mandrel and the plastic. As shown in FIGURE I, heat insulators may be used to separate the various temperature control zones. The use of insulators is optional although their effectiveness generally increases as the difference in the temperature between adjacent zones increases.

In general, the plastics use in the practice of this invention are plastic materials which have been fabricated into various shapes and include polymers such as those based on styrene, vinyl halide, vinylidene halide, vinyl acetate, cellulose acetate or butyrate, ethyl cellulose, acrylic acid esters, metacrylic acid esters, acrylonitrile, ethylene, propylene and higher olefins, isobutylene, fluorolefines and chlorofluoroolefines, as well as copolymers, interpolymers, graft polymers, and chlorinated and chlorosulfonated polymers of the monomers corresponding to the above-mentioned polymeric products and mixtures of the same. A particularly useful material for forming articles such as containers is a rubber modified polystyrene or polystyrene which preferably has incorporated therein a rubber compound grafted on to the molecule.

The medium which is absorbable by the plastic is considered to be any material which is (1) absorbable by the plastic being processed, and (2) convertible to a gaseous state at a temperature below the melting point temperature of the plastic. Preferably, the medium will contain or be a solvent for the plastic and may include a non-solvent to slow the rate of absorption and/or partial solution of the plastic. For the sake of clarification, the term "solvent" also includes those materials in which the plastic is considered slightly soluble. The intent in the choice of the medium is to utilize materials which after exposure to the plastic will cause the plastic to partially foam on the subsequent application of heat.

The choice of the solvent which may be employed will depend primarily on the type of plastic material which is to be steeped, e.g., acetone of methyl ethyl ketone are suitable for the acrylonitrile-butadiene-styrene copolymers while Freon (trichlorofluoromethane) is less desirable. On the other hand, Freon is considered quite suitable for polystyrene homopolymers and rubber modified interpolymers. Among the solvents which find application in the present process there may be listed Freon (trichlorofluoromethane), methylene chloride, acetone, dichloroethylene, xylene, carbontetrachloride, methyl ethyl ketone, benzol, toluol, chloroform and the like. Among the materials which sometimes find utility either as nonsolvents or solvents depending on the type of plastic, there may be included methanol, ethanol, n-pentane, isopentane, hexane, diethylethene and the like.

The steeping operation or exposure of the plastic to the medium generally requires only a few seconds depending for the most part on the depth of foam desired, the type of medium employed, and the respective temperature of the medium and plastic article. The steeping operation may be carried out by any suitable method such as immersion of the plastic article in a liquid medium or even by subjecting the plastic article to vapors in a vessel which may or may not be pressurized.

In general, the plastic article is permitted to dry for short intervals of time prior to the foaming operation. This drying interval allows deeper diffusion and serves to increase the number of cells and decrease their size. This is considered important for good insulating properties. If desired, the drying interval may be accelerated by forced air drafts, moderate heating conditions, etc.

After the drying interval, the plastic article is heated in accordance with the practice of this invention to foam portions of the plastic article at designated areas. The heating means utilized may vary, the final results being affected by the uniformity of heating, rate of heating and temperature level at which it is conducted. The temperature level will, of course, be above the temperature at which the medium converts from a solid or liquid state to a gaseous state. Consequently, any of the fundamental types of heat transfer, i.e., conduction, convection, and radiation may be utilized. For ease of handling, methods depending on convection are generally preferred, that is, the use of a preheated fluid or more preferably a preheated gas circulating within, around or adjacent the plastic article resulting in a heat transfer from the gas to the plastic. In the case of biaxially oriented plastics, it is sometimes desirable to support or fix the sheet dimensionally during the heating operation to avoid loss of orientation.

The products of this invention are formed from plastic materials. The structures which may be fabricated in the practice of this invention are exceptionally useful for applications requiring good insulating characteristics at defined areas and good structural properties. The products formed in the practice of this invention can be most advantageously used in dispensing or vending applications which require stacking arrangements. Where nested containers are dispensed individually from a stack, it is extremely important that the foamed portion of one cup not contact an adjacent cup if proper dispensing or stack release is to be obtained. Consequently, if a partially foamed insulating cup is employed in nested relationship for vending purposes, the area of cup foamed must be rigidly controlled.

It is obvious that many variations may be made in the products and processes set forth above without departing from the spirit and scope of this invention.

What is claimed is:

1. A process of selectively foaming predetermined surface areas on a plastic article of manufacture which comprises creating a temperature differential between at least two selected surface portions of said article by contacting at least one of said selected article surface portions with a cooling surface which is substantially inert to the plastic, exposing at least part of each of said article surface portions to a medium which is readily absorbable by the plastic at one of said temperatures and nonreadily absorbable by the plastic at the other of said temperatures so as to absorb a significantly greater amount of said medium in that surface portion at said one temperature than in that surface portion at said other temperature, said medium being convertible to the gaseous state at a temperature below the melting point of the plastic, and thereafter heating the plastic article to a temperature below the melting point of said plastic but above the temperature at which said medium converts to the gaseous state to produce a foam covering having a boundary along at least part of the edge of one of said surface portions.

2. The process according to claim 1 wherein the medium is (1) absorbable by the plastic article, and (2) convertible to a gaseous state at a temperature below the melting point temperature of the plastic used to form the article.

3. The process according to claim 2 wherein the medium is a solvent for the plastic.

4. The process according to claim 1 wherein the plastic is composed of a rubber modified polystyrene.

5. A process of selectively foaming predetermined surface areas on a plastic container which comprises creating a temperature differential between at least two selected surface portions of said container by contacting at least one of said selected container surface portions with a cooling surface which is substantially inert to the plastic, exposing at least part of each of said container surface portions to a medium which is readily absorbable by the plastic at one of said temperatures and nonreadily absorbable by the plastic at the other of said temperatures so as to absorb a significantly greater amount of said medium in that surface portion at said one temperature than in that surface portion at said other temperature, said medium being convertible to the gaseous state at a temperature below the melting point of the plastic, and thereafter heating the plastic container to a temperature below the melting point of said plastic but above the temperature at which said medium converts to the gaseous state to produce a foam covering having a boundary along at least part of the edge of one of said surface portions.

6. The process according to claim 5 wherein the medium is (1) absorbable by the plastic container, and (2) convertible to a gaseous state at a temperature below the melting point temperature of the plastic used to form the container.

7. The process according to claim 5 wherein the plastic container is a cup.

8. A process of selectively foaming predetermined surface areas on a plastic article of manufacture which comprises creating a temperature differential between at least two selected surface portions of said article by contacting at least one of said selected article surface portions with a cooling surface which is substantially inert to the plastic, exposing at least part of each of said article surface portions to a medium which is readily absorbable by the plastic at said higher temperature and nonreadily absorbable by the plastic at said lower temperature so as to absorb a significantly greater amount of said medium in said higher temperature portion than in said lower temperature portion, said medium being convertible to the gaseous state at a temperature below the melting point of the plastic, and thereafter heating the plastic article to a temperature below the melting point of said plastic but above the temperature at which said medium converts to the gaseous state to produce a foam covering having a boundary along at least part of the edge of one of said surface portions.

9. A process of selectively foaming predetermined surface areas on a plastic container which comprises creating a temperature differential between at least two selected surface portions of said container by contacting at least one of said selected container surface portions with a cooling surface which is substantially inert to the plastic, exposing at least part of each of said container surface portions to a medium which is readily absorbable by the plastic at said higher temperature and nonreadily absorbable by the plastic at said lower temperature so as to absorb a significantly greater amount of said medium in said higher temperature surface portion than in said lower temperature portion, said medium being convertible to the gaseous state at a temperature below the melting point of the plastic, and thereafter heating the plastic container to a temperature below the melting point of said plastic but above the temperature at which said medium converts to the gaseous state to produce a foam covering having a boundary along at least part of the edge of one of said surface portions.

10. A process of selectively foaming predetermined surface areas on a plastic container which comprises the steps of cooling a selected surface portion of said container below a predetermined temperature by contacting said selected container surface portion with a cooling surface which is substantially inert to the plastic, exposing at least part of said thus cooled container surface and remaining portions of said container to a medium which is readily absorbable by the plastic above said predetermined temperature and nonreadily absorbable by the plastic at and below said predetermined temperature so as to absorb a significant amount of said medium in said exposed higher temperature container portions and an insignificant amount of said medium in said exposed lower temperature container portions, said medium being convertible to the gaseous state at a temperature below the melting point of the plastic, and thereafter heating the plastic container to a temperature below the melting point of said plastic but above the temperature at which said medium converts to the gaseous state to produce a foam covering having a boundary along at least part of the edge of one of said surface portions.

11. A process of selectively foaming predetermined surface areas on a plastic container which comprises the steps of cooling a selected surface portion of said container below a predetermined temperature by intimately contacting the inner surface of the plastic container with a surface which is substantially inert to the plastic, at least part of said inert surface being cooled, exposing at least part of said thus cooled container surface and remaining portions of said container to a medium which is readily absorbable by the plastic above said predetermined temperature and nonreadily absorbable by the plastic at and below said predetermined temperature, said medium being convertible to the gaseous state at a temperature below the melting point of the plastic, and thereafter heating the plastic container to a temperature below the melting point of said plastic but above the temperature at which said medium converts to the gaseous state to produce a foam covering having a boundary along at least part of the edge of one of said surface portions.

References Cited

UNITED STATES PATENTS

| | | | |
|---|---|---|---|
| 2,331,702 | 10/1943 | Kopitke | 264—97 |
| 2,432,668 | 12/1947 | Kingston. | |
| 2,613,393 | 10/1952 | Flanagan | 18—15 |
| 3,144,493 | 8/1964 | Santelli | 264—51 |
| 3,156,015 | 11/1964 | Harrison | 264—327 |
| 3,157,717 | 11/1964 | Thommes | 264—36 |
| 3,240,853 | 3/1966 | Schickman | 264—327 |
| 3,262,625 | 7/1966 | Russel | 264—45 |

FOREIGN PATENTS

| | | |
|---|---|---|
| 916,116 | 7/1949 | Germany. |
| 706,632 | 3/1954 | Great Britain. |

ROBERT F. WHITE, *Primary Examiner.*

R. R. KUCIA, *Assistant Examiner.*

U.S. Cl. X.R.

264—28, 53, 343